(12) United States Patent
Goldstein

(10) Patent No.: US 9,239,041 B2
(45) Date of Patent: Jan. 19, 2016

(54) AIRBORNE WIND ENERGY CONVERSION SYSTEM WITH GROUND GENERATOR AND UNORTHODOX POWER CAPTURE OR TRANSFER

(71) Applicant: Leonid Goldstein, Austin, TX (US)

(72) Inventor: Leonid Goldstein, Austin, TX (US)

( * ) Notice: Subject to any disclaimer, the term of this patent is extended or adjusted under 35 U.S.C. 154(b) by 0 days.

(21) Appl. No.: 14/601,173

(22) Filed: Jan. 20, 2015

(65) Prior Publication Data

US 2015/0130188 A1    May 14, 2015

Related U.S. Application Data

(63) Continuation of application No. PCT/US2013/051419, filed on Jul. 21, 2013.

(60) Provisional application No. 61/674,372, filed on Jul. 22, 2012, provisional application No. 61/676,976, filed on Jul. 29, 2012, provisional application No. 61/678,703, filed on Aug. 2, 2012, provisional application No. 61/679,859, filed on Aug. 6, 2012, provisional application No. 61/680,780, filed on Aug. 8, 2012.

(51) Int. Cl.
*F03D 5/06* (2006.01)
*F03D 9/00* (2006.01)
*B64C 39/02* (2006.01)

(52) U.S. Cl.
CPC .............. *F03D 9/002* (2013.01); *B64C 39/022* (2013.01); *F03D 5/06* (2013.01); *F05B 2240/921* (2013.01); *Y02E 10/70* (2013.01)

(58) Field of Classification Search
CPC ........................................................ F03D 5/06

USPC ........................................................... 290/55
See application file for complete search history.

(56) References Cited

U.S. PATENT DOCUMENTS 3,987,987 A * 10/1976 Payne et al. ............... 244/153 R
4,165,468 A   8/1979 Fry
4,207,026 A   6/1980 Kushto
(Continued)

FOREIGN PATENT DOCUMENTS

RU    2006663 C1 *  1/1994
RU    2064085 C1    7/1996
(Continued)

OTHER PUBLICATIONS

M. Canale, L. Fagiano, M. Milanese, M. Ippolito "KiteGen project: control as key technology for a quantum leap in wind energy generators." (Proc. of American Control Conference, New York 2007).
Miles Loyd "Crosswind Kite Power" (Energy Journal, 1980; 4:106-11).

*Primary Examiner* — Joseph Waks

(57) ABSTRACT

An airborne wind energy conversion system with a ground generator and unorthodox power capture or transfer means, including such embodiments as: a system with an ultra-long flexible wing, which serves both for power harvesting and power transfer; a system with a tethered wing, the tether having an airfoil cross section in at least a substantial part of its length and participating in power harvesting; a system with a very long semi-circular wing, harvesting and transferring wind power by its helical motion; a system in which a conventional wing both harvests wind power and excites waves in the tether, the waves transferring the power.

19 Claims, 14 Drawing Sheets

(56) References Cited

U.S. PATENT DOCUMENTS

| | | | |
|---|---|---|---|
| 6,072,245 A | 6/2000 | Ockels | |
| 6,523,781 B2 * | 2/2003 | Ragner | 244/153 R |
| 7,219,861 B1 | 5/2007 | Barr | |
| 7,504,741 B2 | 3/2009 | Wrage | |
| 7,546,813 B2 | 6/2009 | Wrage | |
| 8,080,889 B2 | 12/2011 | Ippolito | |
| 8,109,711 B2 | 2/2012 | Blumer | |
| 2010/0001534 A1 * | 1/2010 | Kim | 290/55 |
| 2011/0025060 A1 | 2/2011 | Toneaki | |

FOREIGN PATENT DOCUMENTS

| | | | |
|---|---|---|---|
| RU | 2178830 C2 | * | 1/2002 |
| WO | WO 9401326 A1 | * | 1/1994 |
| WO | WO 2005100147 A1 | * | 10/2005 |
| WO | WO 2008047963 A1 | * | 4/2008 |
| WO | WO 2009026939 A1 | * | 3/2009 |
| WO | WO 2009122754 A1 | * | 10/2009 |

* cited by examiner

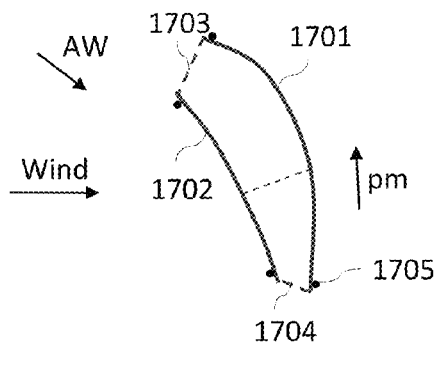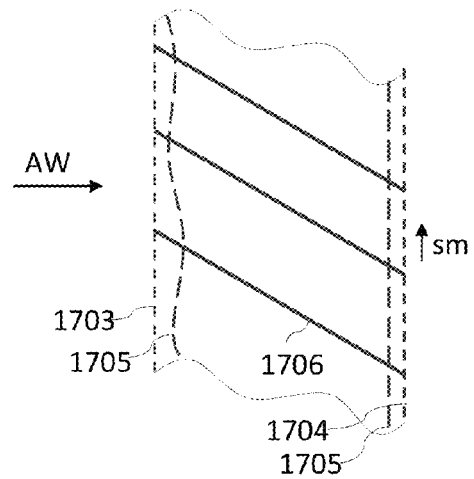
Fig. 17A
Fig. 17B
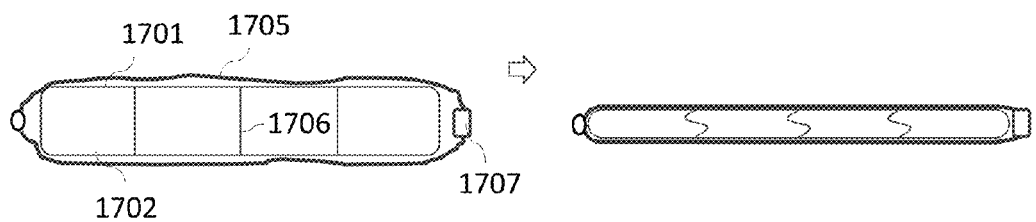
Fig. 17C
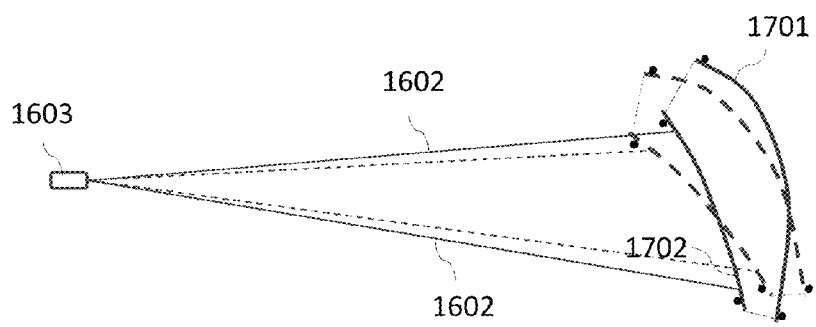
Fig. 18

AIRBORNE WIND ENERGY CONVERSION SYSTEM WITH GROUND GENERATOR AND UNORTHODOX POWER CAPTURE OR TRANSFER

CROSS REFERENCE TO RELATED APPLICATIONS

This application is a continuation of PCT Application No. PCT/US13/51419, filed 21 Jul. 2013, which claims the benefit of U.S. Provisional Applications No. 61/674,372, filed 22 Jul. 2012, No. 61/676,976, filed 29 Jul. 2012, No. 61/678,703, filed 2 Aug. 2012, No. 61/679,859, filed 6 Aug. 2012, No. 61/680,780, filed 8 Aug. 2012 by the same inventor as herein, the entire disclosure of which is incorporated herein by reference.

BACKGROUND OF THE INVENTION

This invention is generally directed to airborne wind energy conversion systems and methods.

The classical work in the airborne wind energy conversion systems (AWECS) is the article by Miles L. Loyd "Crosswind Kite Power" (1979), in which the author disclosed a wind energy harvesting device, comprising a tethered wing, flying cross wind and harvesting wind energy, and transferring harvested energy to a ground based generator via motion of the tether. Crosswind motion of a wing is much more efficient, than downwind motion, allowing the wing to fly many times speed of the wind and harvest energy from an area, many times larger than the area of the wing. The article has also offered two ways of converting harvested mechanical energy into electrical energy.

In one of them, the electrical generator is on the ground and the tether is reeling out, transferring motion to the rotor of the generator. Systems, implementing this method are discussed in the U.S. Pat. Nos. 7,504,741 & 7,546,813 by Wrage et al, U.S. Pat. No. 8,080,889 by Ippolito et al, U.S. Pat. No. 6,523,781 by Ragner. Velocity of the lengthwise motion of the tether must be well below velocity of the wing. In such conditions, the tether is subject to the very high force, requiring thick tethers and creating very large torque in the ground equipment for useful power, thus rendering the whole system uneconomical.

In another method, the generator is airborne and its rotor is coaxial with the propeller, driven by relative air flow. This method is discussed in the U.S. Pat. No. 3,987,987 by Payne et al., U.S. Pat. No. 8,109,711 by Blumer et al. Among shortcomings of this method are large weight of the generator, carried onboard, large weight and limited flexibility of the tether, which is tasked with conducting electrical power from the generator to the ground.

The systems with downwind wing motion or with drag based (i.e., non-airfoil) airborne members are also worth mentioning. One such system is discussed in the U.S. Pat. No. 6,072,245 by Ockels. Aside of the shortcoming of the downwind wing motion, it forces the wings to approach the ground and uses a complex apparatus to prevent collision between the wings and the ground mechanisms.

This invention is directed to solving these shortcomings and providing a cost efficient AWECS. Certain airborne wind energy conversion systems with fast motion transfer were disclosed in PCT/US12/66331 and PCT/US13/30314 by Goldstein. Nevertheless, there is need in larger variety of cost efficient AWECS. This invention is directed to provide such variety.

SUMMARY OF THE INVENTION

This invention is generally directed to airborne wind energy conversion systems and methods.

One embodiment of the invention is a device for converting wind energy into electrical energy, comprising: a ground platform; a rotational member on the ground platform; a very long airborne flexible wing, coupled to the rotational member; an electric generator on the ground platform, having a rotor, rotationally coupled to the rotational member.

This device can further comprise an electronic control system, controlling motion of the wing. This device can further comprise a belt, coupled to the very long airborne flexible wing; while the rotational member can have a pulley or a sheave or a sprocket; and the belt be adapted to transfer motion of the very long airborne flexible wing to the rotational member. The belt is coupled to one or both ends of the very long airborne flexible wing. In further variations, wing flexing may cause significant change (10% or more) in the distance between at least one end of the very long airborne flexible wing and the center of the very long airborne flexible wing. The very long airborne flexible wing can have either cambered or non-cambered profile along most of its length, or alternating cambered/non-cambered/reverse cambered profile. The very long airborne flexible wing is preferably adapted to move cross wind faster than the speed of the wind. The very long airborne flexible wing may be significantly curved in the plane, perpendicular to its chord. For example, both end sections of the very long airborne flexible wing can have an angle of at least 45 degrees to its central section when airborne. The very long airborne flexible wing may have multiple (like five or more) control empennages at different distances from the first end of the very long flexible wing.

Another embodiment of the invention is a method of converting wind energy into electrical energy, comprising steps of: providing a very long airborne flexible wing, coupled to a rotational member on the ground; providing an electric generator on the ground, having a rotor, rotationally coupled to the rotational member; using the very long airborne flexible wing to harvest the wind energy and to transfer it to the electric generator. Further, the motion of different parts of the very long airborne flexible wing may be controlled separately by an electronic control system.

Another embodiment of the invention is a device for converting wind energy into electrical energy, comprising: an airborne assembly, having a first sail, adapted to move cross wind, and at least one second non-rotating sail, attached to the first sail at an angle 20 degrees or more, and adapted to develop lift force in the relative air flow, created by the motion of said first sail; a ground platform with an electric generator, having a rotor and a stator; a belt, coupled to the airborne assembly and adapted to convert motion of the second sail into rotation of the rotor of the generator. Further, the first sail and the second sail may be integrated into a single surface.

Another embodiment of the invention is a method for converting wind energy into electrical energy, comprising steps of: providing an airborne assembly comprising a first sail and a second sail; employing the first sail to induce primary motion of the assembly; employing the second sail to exploit relative air flow, created by the primary motion of the assembly to develop secondary motion in another direction; using the secondary motion of the assembly to drive a rotor of an electric generator.

Another embodiment of the invention is a device for converting wind energy into electrical energy, comprising: an airborne wing; a ground platform with an electric generator; a cable, one end of which is coupled to the wing and another end of which is coupled to a generalized rotor of the electric generator; wherein wind energy is harvested by the wing and transferred to the electric generator by mechanical waves in the cable.

Another embodiment of the invention is a method for converting wind energy into electrical energy, comprising steps of: harvesting wind energy by an airborne wing; providing a ground platform with an electric generator; transferring harvested energy from the wing to the electric generator by mechanical waves in a cable.

In some embodiments, power or energy can be transferred to the generator by a mechanical wave in the very long flexible wing itself.

The description uses prior patent applications by the inventor:

PCT Application PCT/US12/66331 AIRBORNE WIND ENERGY CONVERSION SYSTEM WITH FAST MOTION TRANSFER PCT Application PCT/US12/67143 WIND POWER DEVICE WITH DYNAMIC SAIL, STREAMLINED CABLE OR ENHANCED GROUND MECHANISM PCT Application PCT/US13/30314 AIRBORNE WIND ENERGY CONVERSION SYSTEM WITH ENDLESS BELT The description additionally references the following publication:

The article "Crosswind Kite Power" by Loyd (Energy journal, 1980; 4:106-11).

All referenced patents, patent applications and other publications are incorporated herein by reference, except that in case of any conflicting term definitions or meanings the meaning or the definition of the term from this description prevails.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

The accompanying drawings illustrate the invention. The illustrations omit details not necessary for understanding of the invention, or obvious to one skilled in the art, and show parts out of proportion for clarity. In such drawings:

FIG. 17A shows a vertical cross-sectional view of a wing cell in this embodiment.

FIG. 17B shows a perpendicular cross-sectional view of the wing cells in this embodiment.

FIG. 17C shows a frontal view of the wing cells in this embodiment.

FIG. 18 is a vertical cross-sectional view of some details of this embodiment.

GLOSSARY

A very long flexible wing is defined here as a flexible airfoil, designed to be coupled to an object on the ground, or actually coupled to an object on the ground in such a way that the distance between the object on the ground and the center of the wing is equal or less than half the length of the wing (wingtip to wingtip, measured when the wing is straightened). Typically (but not necessary) such wing will have aspect ratio of 100:1 or more. Also, such wing may be flexible, as a cable, but controllable, i.e., the system control the direction of the airfoil plane in each point, and it may be different in different points.

The very long flexible wing above may be cambered, non-cambered (symmetrical) or have cambered in one direction, cambered in opposite direction and non-cambered sections alternating. In some embodiments, camber of some or all sections of the wing may be variable by control actuators. An example length of the very long flexible wing can be 150 m or above.

Generalized rotor is defined here as a non-stationary (but not necessarily rotating) part of electric generator, a counterpart to a stator.

The term belt includes a belt of round section and a belt with perforations.

DETAILED DESCRIPTION OF THE PREFERRED EMBODIMENTS

First Group of Preferred Embodiments

One embodiment of the invention is a device for converting wind energy into electrical energy, comprising: an airborne very long flexible wing; a ground platform with an electric generator; an electronic control system; at least two cables or two ends of a single cable, attached to the wing near the both ends of the wing; where the cables or cable transfer mechanical energy of the wing to the rotor of the generator.

The cables can be attached to a belt, the belt engaging a pulley or a sprocket, the pulley or sprocket rotationally coupled to the rotor of the electric generator. The belt can move with a speed, exceeding speed of the wind.

Another embodiment of the invention is a method for converting wind energy into electrical energy, comprising steps of: providing a very long flexible wing, airborne and moving in the air under power of wind; providing a ground platform with an electric generator, comprising a rotor and a stator; providing an electronic control system; controlling the wing in such a way, that it forms a curve in the horizontal plane and different parts of the wing move in different directions; using motion of the wing to drive a rotor of said electric generator.

The belt can move along its length with a speed, exceeding speed of the wind. The motion of ends of the wing away from each other can be used to increase the speed of the belt.

Figure 1:
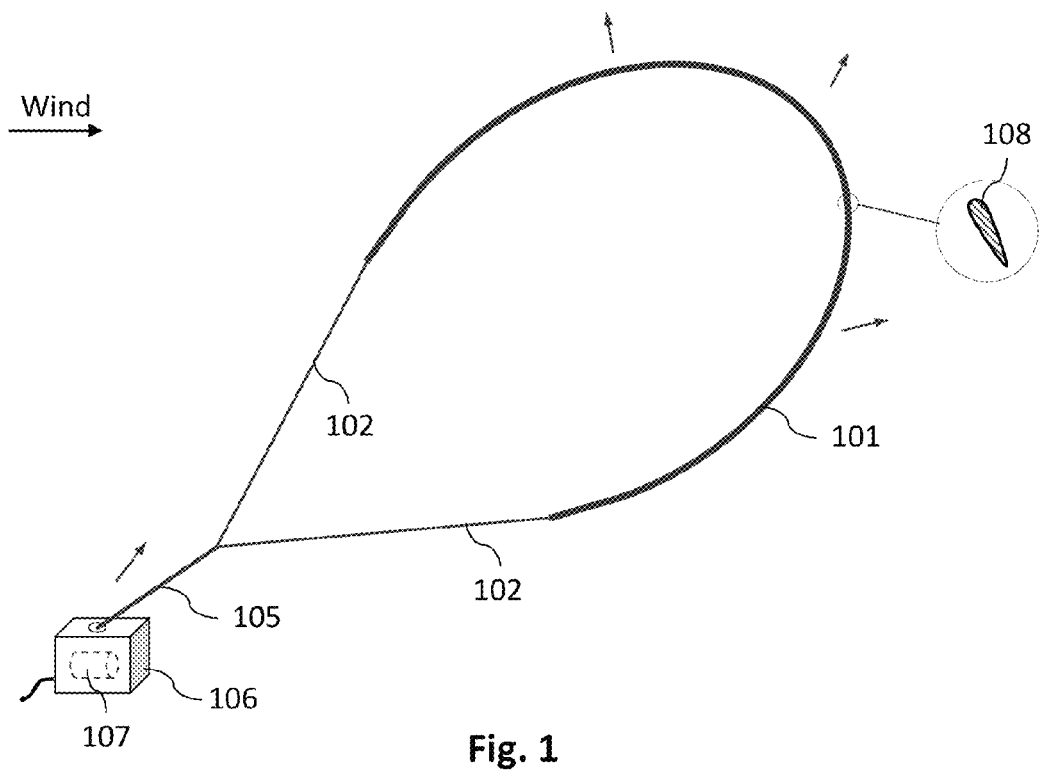
FIG. 1 shows the first embodiment of the invention, comprising an airborne very long flexible wing and a ground station with a generator.

FIG. 1 shows an embodiment of the invention. The system comprises a very long flexible wing 101. Two cables 102 are attached to its ends. Alternatively, these are not two separate cables, but two end of a single cable, passing through wing 101. Cables 102 are attached to a belt 105. Belt 105 wraps around a pulley and/or a drum in a ground station 106, which transfers its motion to a rotor of an electric generator 107, which produces electric energy. Wing 101 has a symmetrical profile in the cross-section, as shown in an inset 108. In the first approximation, wing 101 is flying in a vertical arc up and down with a speed, exceeding speed of the wind 4-10 times. The line ground station-wing's center changes its angle to the horizontal plane in the range 15°-50°. Arrow near belt 105 shows direction of its motion in a working phase. (Numerals 103 and 104 are not used in this figure).

Figure 8A:
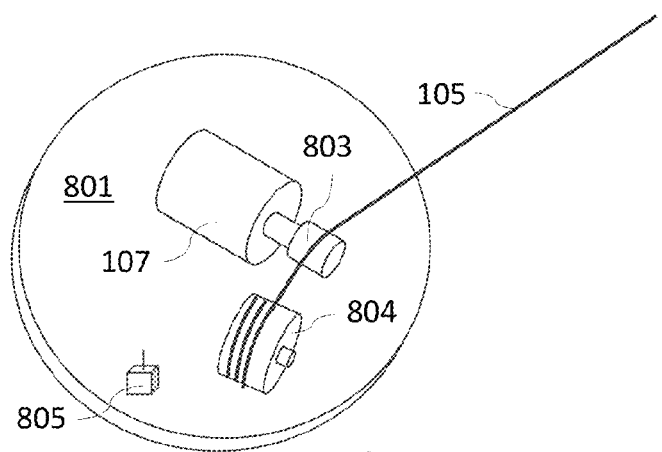
FIG. 8A shows details of a ground station in the first embodiment.
Figure 8B:
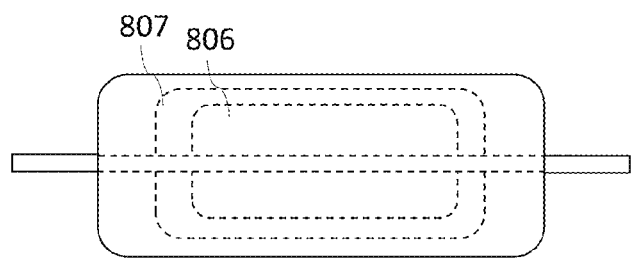
FIG. 8B shows other details of a ground station in the first embodiment.

FIG. 8A and FIG. 8B show details of ground station 106 according to this embodiment of the invention. Ground station 106 comprises a rotational platform 801, an electric generator 802, having at least a rotor and a stator, a pulley 803, rotationally connected to the rotor of generator 802 and a drum 804 for belt 105. A control system 805 is provided. Electric generator 802 comprises a rotor 806 and a stator 807. The system's operation is cyclical, with each cycle consisting of 4 phases, two of them are working (i.e., wind energy is harvested and transferred to generator 107) and two of them are returning:

Phase 1: upstroke
Phase 2: upper return
Phase 3: downstroke
Phase 4: lower return The system operates in response to commands of control system 805. In the upstroke, wing 101 moves generally up and away (downwind) from ground station 106. The profile of the center of wing 101 is inclined approximately as shown in inset 108 in FIG. 1. The ends of wing 101 move sideways, in addition to moving up and away from ground station 106. Cables 102 pulls belt 105, which unwinds off drum 804 and rotates pulley 803, which transfers the rotation to the rotor of electric generator 107, which produces electricity. When the center of wing 101 arrives to a pre-defined altitude, the system switches to the upper return phase. A small electric motor, connected to a drum 804, rotates drum 804 in the opposite direction, winding belt 105 back on it, with a small expenditure of energy. In this phase pulley 803 is disconnected from generator 107, and angles of attack of different parts of wing 101 are changed to zero to minimize air drag. The upper return phase takes less or same time as the upstroke phase. After winding belt 105 to a pre-defined length, the system switches to the downstroke. In the downstroke, angles of attack of different parts of wing 101 are changed to create aerodynamic lift with a downward component. Wing 101 moves generally down and away from ground station 106. The ends of wing 101 move sideways, in addition to moving down and away (downwind) from ground station 106. Cables 102 pull belt 105, and electric energy is generated as in the upstroke. When the center of wing 101 arrives to a pre-defined altitude, the system switches to the lower return phase. It is similar to the upper return phase, except that in the end of it wing 101 arrives into a position for the start of the upstroke.

Figure 4:
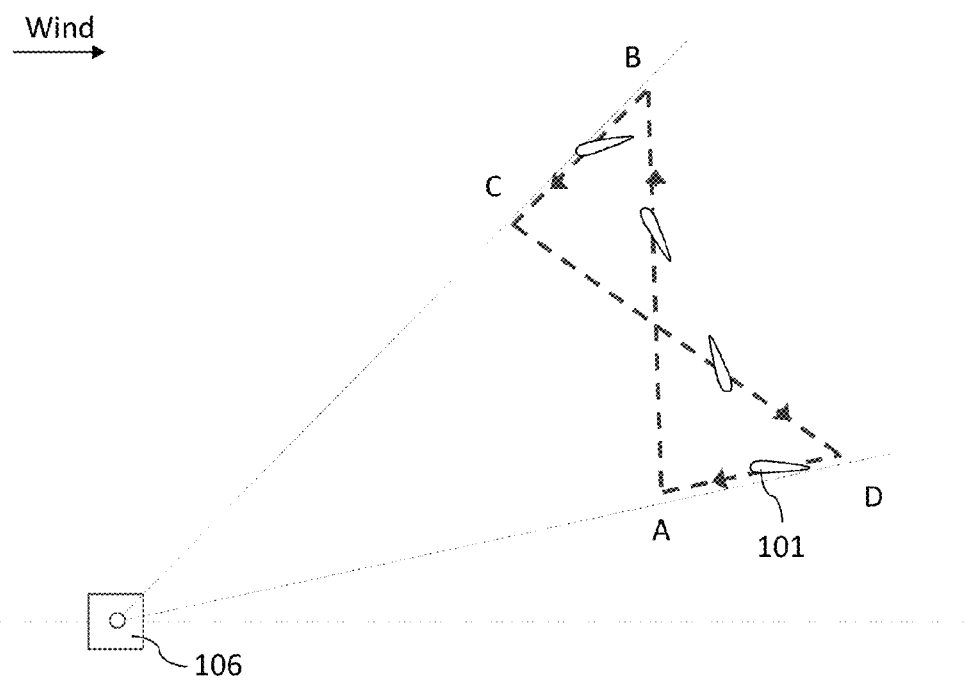
FIG. 4 shows a schematic view of motion of wing's profile in the vertical plane parallel to wind in the first embodiment.

FIG. 4 shows motion of the profile of the center of wing 101. Segment AB—the upstroke, BC—the upper return, CD—the downstroke, DA—the lower return. The figure is a schematic depiction in the vertical plane, parallel to the wind. Angles of the profile of wing 101 in FIG. 4 are typical for at least one variation of this embodiment.

Figure 2:
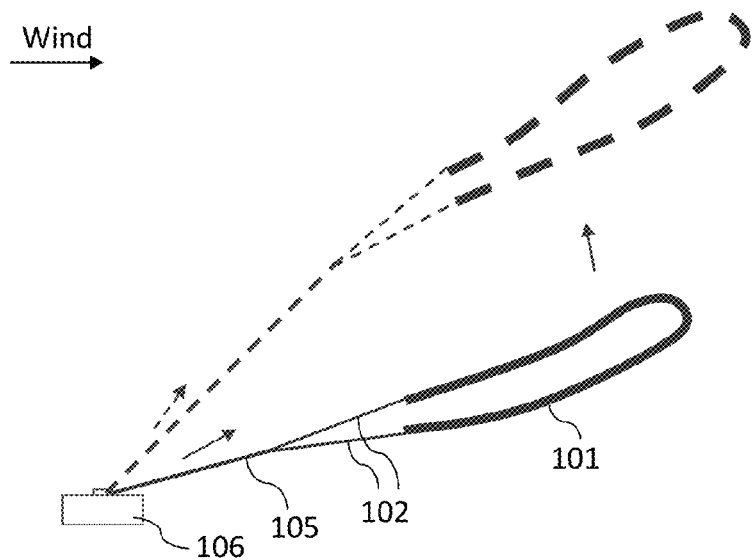
FIG. 2 shows a side view of the wing motion in the first embodiment in the vertical plane parallel to wind.

FIG. 2 shows motion of the airborne parts of this embodiment in the vertical plane, parallel to the wind. The solid lines are the system in the beginning of the upstroke, the dashed lines are the system in the end of the upstroke. It shows how wing 101 moves up and downwind, while the airborne part of belt 105 extends. Also, it shows that wing 101 does not necessarily lies in one plane. The arrows show motion.

Figure 3:
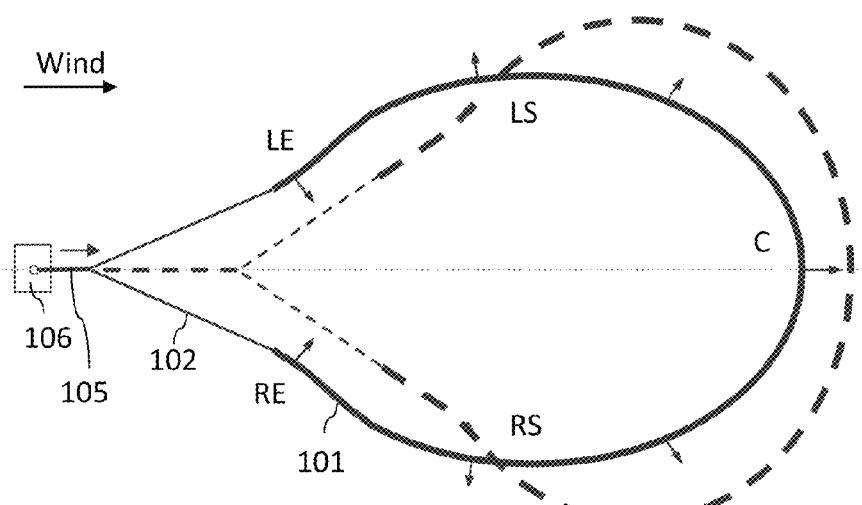
FIG. 3 shows a view of the first embodiment in a plane, inclined to the horizon at 30 degrees.

FIG. 3 shows motion of the airborne parts of this embodiment, projected to the plane, inclined 30° to horizontal plane in the direction of the vector of the wind. The solid lines are the system in the beginning of the upstroke, the dashed lines are the system in the end of the upstroke. The areas of wing 101 around its center move cross wind upwards and slightly away (i.e. outward). The angle of attack can be 5°. Of course, the horizontal speed of the wing's center (the point C in FIG. 3) must be below the speed of the wing. It may be about ⅓ of the speed of the wind. The vertical component of the speed can be much higher than the speed of the wind. The local angle of attack decreases with increasing distance from the wing's center, but the aerodynamic lift remains and it is directed outwards on most of the wing's stretch, for example, in the points LS and RS. But closer to the ends (i.e. at 10% of the wing's length), the angle of attack becomes 0, and then switches its sign, i.e. the aerodynamic lift is directed inward around the points LE and RE. This prevents ends of wing 101 from flying too far apart in this embodiment. Arrows with small heads in FIG. 3 show directions of forces, developed by parts of wing 101, not velocities. In the upstroke, the form of wing 101 changes, as shown by the dashed lines. Since the length of wing 101 and cables 102 remains the same, the end of belt 105 moves larger distance, than the center C of wing 101. Thus, the velocity of belt 105 is higher than velocity of center C of wing 101. For the specific variation of this embodiment, shown in FIG. 3, the speed of belt 105 is about 3-4 times higher than speed of point C. It should be noted, that wing 101 harvests wind energy over all of its length, even in the points RS and LS, in both upstroke and downstroke, because its motion is at least partially cross-wind and.

High speed of belt motion is important, because it allows to transfer the same power with lower forces, acting on belt 105 and cables 102. Also, pulley 803 has higher RPM and is stressed by lower forces. Higher initial RPM allows smaller gearbox or no gearbox at all.

Figure 5:
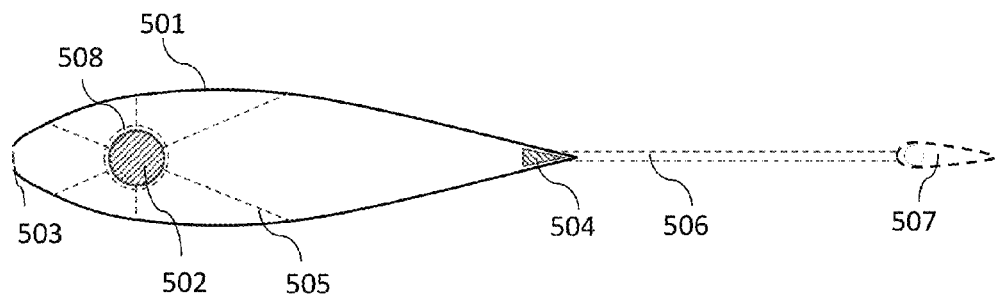
FIG. 5 shows a view of the profile cross-section of the wing in the first embodiment.
Figure 6:
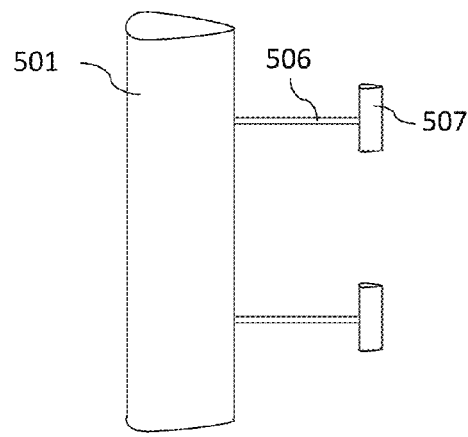
FIG. 6 shows a perspective view of a section of the wing in the first embodiment.

Wing 101 in this embodiment can be based on an inflatable parafoil design. FIG. 5 shows profile cross-section of wing 101. Cable 502 serves as the main strength element of wing 101. Cable 502 can be made of aramids or para-aramids, ultra high molecular weight polyethylene or another light and strong material. There is a fabric skin 501, which can be made of nylon or another strong and light fabric. There is an opening 503 in the front side, allowing ram air to enter and inflate wing 101, with an optional valve. There is a flexible insert 504 in the trailing edge that can be made of the same material as cable 502. Skin 501 is attached to cable 502 by multiple cords 505, serving to transfer forces from the surface of wing 101 to cable 502. A micro-wing 507 is provided at the end of a boom 506. Multiple micro-wings 507 are distributed evenly over the length of wing 101. Each micro-wing 507 serves as both a stabilizer and an elevator. Boom 506 goes through wing 101 and is attached to cable 502 by a ring 508. Cables 102 are connected to cable 502 at its ends, and can simply be extensions of cable 502. Thickness and chord of wing can be different in different parts of wing 101, as well as thickness of cable 501. Thickness and chord of wing will usually decrease near the ends of wing 101. An electric and/or optical cable can pass inside of wing 101 to transfer data and/or small electric current. FIG. 6 shows close external view of a fragment of wing 101 with micro-wings 507 on booms 506. Wing 101 is divided into rectangular cells, as it is typical in kite wings. Skin 501 and insert 504 can be cut at equal distances in order to increase flexibility of wing 101.

Figure 7:
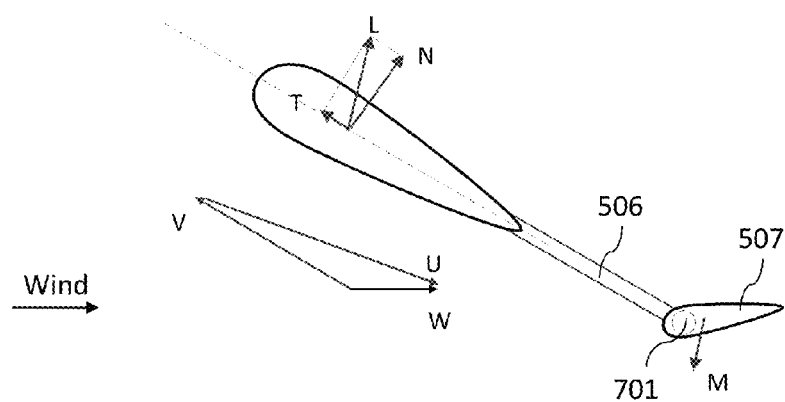
FIG. 7 shows a schematic view of velocities and forces, acting on the wing and the empennage/micro-wing in the first embodiment.

FIG. 7 shows some details of micro-wing 507 and explains forces, acting on the system. Micro-wing 507 is a rigid and symmetrical (non-cambered) airfoil. It is equipped with an actuator 701, which can change angle of the chord of micro-wing 507 to boom 506 in response to a command from control system 805. This causes local change of angle of wing 101 in the opposite direction. In FIG. 7, vector W shows velocity of the wind, vector V shows velocity of the wing, vector U shows velocity of the relative air flow (or apparent wind). In accordance with the laws of aerodynamics, there is a lift force L, acting (locally) on wing 101 perpendicular to the relative air flow. Lift L can be decomposed into the normal force N and torque T. Normal force N pushes local section of wing downwind or sideways. Sideways motion allows to sweep more area. Torque T, acting along velocity V, transfers wind power to wing 101. Drag is not shown.

Control system 805 continuously calculates optimal shape and trajectory of wing 101 and issues commands to multiple actuators 701, causing changes in the angles of attack of different areas of wing.

Sample System Parameters:
Length of wing 101: 6,000 m
Thickness of wing 101: 0.5 m
Chord of wing 101: 5 m
Length of one cable 102: 1000 m
Angle between cables 102: 60°
Length of belt 105 in the air: variable, 1000-1,500 m
Minimum wing altitude: 500 m
Maximum wing altitude: 1,800 m
Distance between micro-wings 507: 10 m
Typical wind speed: 15 m/s
Horizontal speed of center of wing 101: 5 m/s
Vertical speed of center of wing 101: 60 m/s
Speed of belt 105: 25 m/s
Cycle time: 60 seconds Among advantages of this embodiment over existing wind turbines and airborne wind energy conversion systems (AWECS) is its low cost. It is derived mainly from two sources. The first one is the low cost and high efficiency of the flexible wing, moving cross wind. Another one is the high speed of motion transfer by belt 105, as described above, creating lower forces and momentum in the ground based equipment.

Control system 805 comprises a ground based subsystem and an airborne subsystem. The ground based subsystem comprises one or more central processors or microcontrollers, sensors and communication means for communicating with sensors and actuators on wing 101. Communication means is a wireless network with a transceiver at the airborne end of belt 105 and/or optical or copper wires, going through the cables 102 and then through the length of wing 101 to the wing sensors and actuators 701. The ground sensors may include anemometer, barometer, radar, hygrometer, thermometer, GPS, cable tension meter, RPM meter, cameras for observing the wing and other. The airborne sensors may be located in one or multiple parts of wing 101 and include speed meter, altimeter, accelerometer, gyroscopic sensor, GPS, compass, cameras and other. One control system 805 can serve multiple ground platforms. Control system 805 can be connected to the Internet to receive general weather information, especially warnings of extreme weather events. Control system 805 is responsible for maneuvers of wing 101 and other actions, performed by the system.

Belt 105 can be made of para-aramids, ultra high molecular weight polyethylene or another strong material. A cable with round cross section can be used as belt 105. Belt 105 can be perforated, in which case a sprocket is used instead of pulley 803. Cables 102 can have a streamlined cross-section. More on the streamlined cable is in PCT/US12/67143 by the inventor. Wing 101 can be manufactured like a wing of a modern kite, repeated sufficient number of times.

Stabilization of wing 101 in flight may be achieved by less expensive means than multiple booms 506 with micro-wings 507. For example, it can be achieved by attaching multiple flexible plastic strips to the rear end of wing 101. Then only a small number of movable micro-wings 507 is required to control the wing (i.e. to change its angle of attack). Wing 101 may have cuts or areas of little lateral rigidity in it in order to allow it to easier turn upside down.

In more embodiments, other types of airfoil can be used for wing 101. Cable 502 can be used to support leading edge of the wing. Wing 101 can be one sided (like a sail). A flexible tube or half tube can be used instead of cable 502 or in addition to cable 502 to support the leading edge. Wing 101 can be permanently inflated. Wing 101 can be made of rigid sections, connected by flexible sections and/or flexible cables. Wing 101 can be composed of sections with a rigid leading edge and flexible skin. Insert 504 can be built of rigid sections, connected by a flexible cord.

Figure 9:
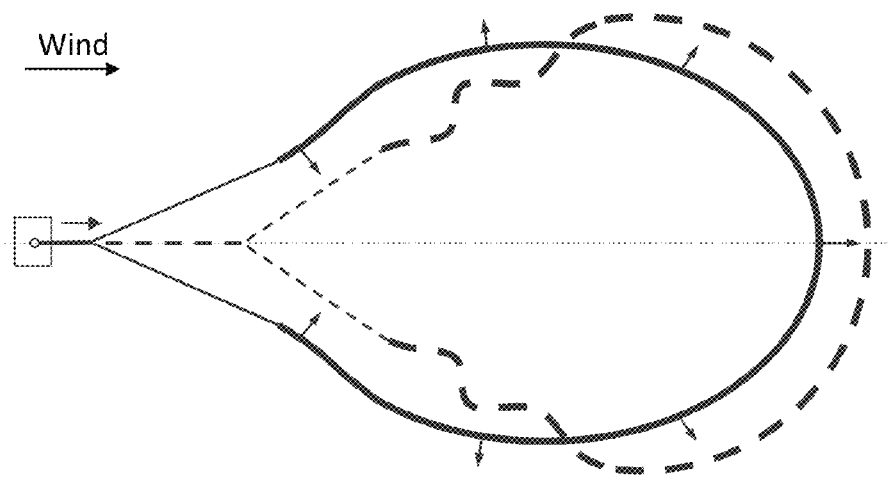
FIG. 9 shows a view of a modification of the first embodiment in a plane, inclined to the horizon at 30 degrees.
Figure 10:
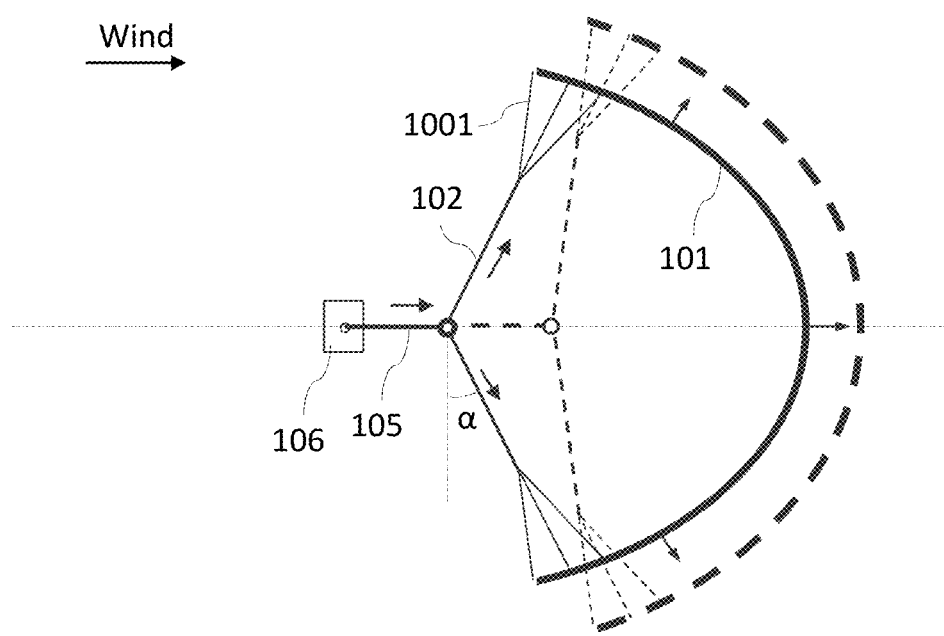
FIG. 10 shows a view of another modification of the first embodiment in a plane, inclined to the horizon at 30 degrees.

In additional embodiments, wing 101 moves not in a vertical arc, but in a horizontal one, or at different angle to the horizon (with obvious changes). Multiple wings 101 can be used with a single ground station. In another embodiment, instead of or in addition to driving the rotor of generator 107, belt 105 can transfer its energy to energy storage, for example, by compressing air or pumping water. In additional embodiments, not only angle of attack of wing 101 is changed, but its aerodynamic profile, providing wing 101 with a camber. Micro-wings 507 can be used for this purpose, or additional devices, changing wing's curvature. Rotational platform 801 can be replaced by a non-rotational one by placing pulley 804 vertically and providing guiding rollers, guiding belt 105 horizontally (with the wide side of belt 105 oriented vertically), while rotating themselves around the platform. In more embodiments, drum 804 and pulley 803 can be combined into one. Wing 101 can accept different forms. FIG. 9 shows an embodiment, in which neighboring parts of wing 101 move in opposite directions, and wing 101 shows wave-like areas. This allows to increase speed of belt 105 even further. FIG. 10 shows another embodiment. It is similar to the previous embodiments, but cables 102 are used differently. In the embodiment from FIG. 1, cables 102 are connected to the ends of wing 101, essentially becoming its extensions. In FIG. 10 embodiment, cables 102 are connected to outer quarters of wing 101. Suspension lines 1001 are used to distribute the load equally over the length of the outer quarters. Consequently, cable 102 is perpendicular to the section of wing 101, to which it is attached (more precisely, perpendicular to the tangent in the center of the section). Also, the angle between the cables 102 exceeds 90° degrees for all times. In the working phases wing 101 moves downwind and outwards, and up or down according to the stroke. Cables 102 follow wing's ends outwards, causing belt 105 to move with the speed, which can be many times the speed of each cable 102. For example, in a variation of this embodiment the angle between cable 102 changes from 155° to 165°, so that average angle $\alpha=10°$. The ratio of speed of belt to speed of cable 102 is $1/\sin \alpha = 1/\sin 10° = 5.76$. Cable 102 has to be stronger than belt 105 in the same proportion, though. Speed of cable 102 can be, in turn, higher than the speed of wind, because corresponding wing section moves at angle to wind.

Second Group of Preferred Embodiments

In this group, one embodiment is a device for converting wind energy into electrical energy, comprising: an airborne wing, moving cross wind; a ground platform with an electric generator, comprising a rotor and a stator; an electronic control system; a cable-wing, attached to said airborne wing, having airfoil cross section in at least some part of its length; where the cable is used both to harvest wind energy and to transfer harvested energy to the rotor of the electric generator.

Another embodiment is a method for converting wind energy into electrical energy, comprising steps of: providing an airborne wing, moving cross wind; providing a ground platform with an electric generator, comprising a rotor and a stator; providing a cable-wing, attached to the airborne wing, having airfoil cross section in at least some part of its length; using said cable both to harvest wind energy and to transfer the harvested energy to the rotor of said electric generator.

Figure 11:
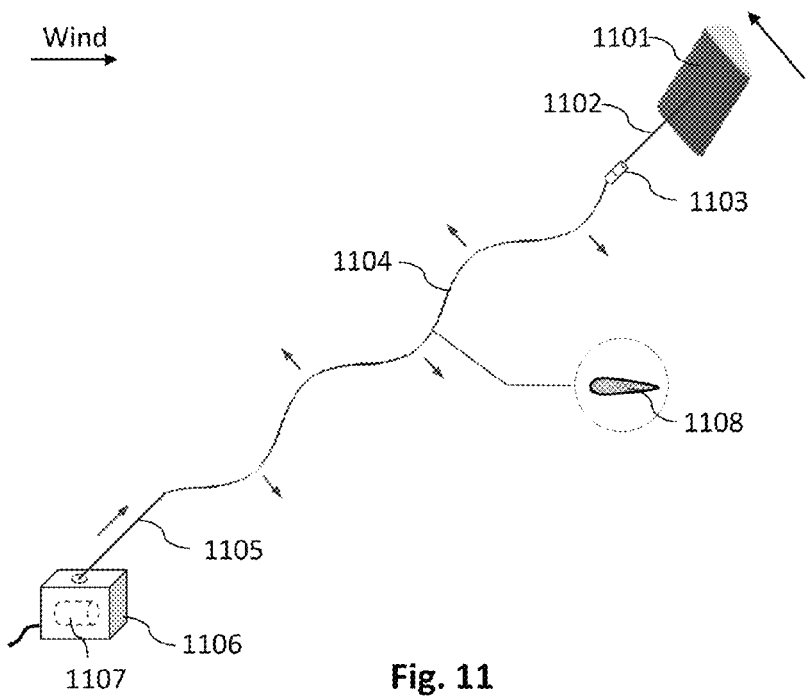
FIG. 11 shows a general view of second embodiment of the invention.
Figure 12:
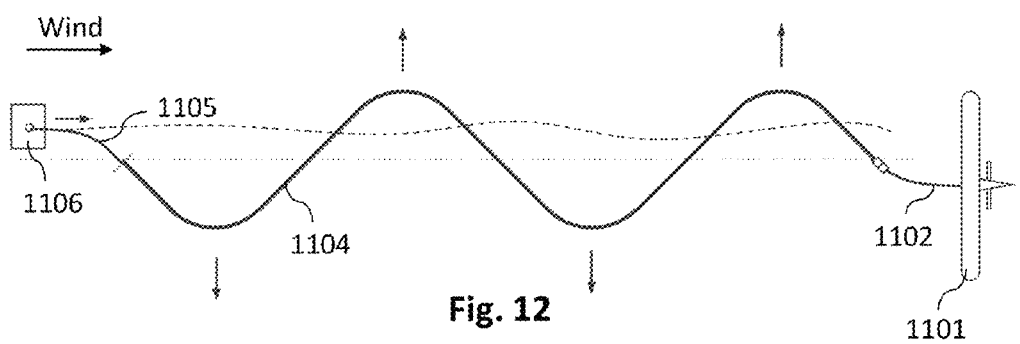
FIG. 12 shows a view of this embodiment in the plane, perpendicular to the wing motion.

FIG. 11 shows an embodiment among this group of embodiments. It comprises a "conventional" wing 1101. Cable 1102 is attached to the lower surface of wing 1101 and to the upper part of an anti-twist device 1103. A cable-wing 1104 is attached to the bottom of anti-twist device 1103. A belt 1105 is attached to the lower end of cable-wing 1104. Belt 1105 wraps around a pulley and/or a drum in a ground station 1106, which transfers its motion to a rotor of an electric generator 1107, which produces electric energy. Cable-wing 1104 has a symmetrical (non-cambered) airfoil profile in the cross-section, as shown in inset 1108. Wing 1101 is flying in a vertical arc up and down with a speed, exceeding speed of the wind 4-20 times. The line ground station-wing changes its angle to the horizontal plane in the range 30°-60°. Ground station 1106 can be the same as ground station 106, described in FIG. 8A and FIG. 8B. Belt 1105 may be the same as belt 105. Coming back to FIG. 11, control system 805 issues a command to actuators, attached to cable-wing 1104, to change an angle of attack of the profile to the incoming airflow, creating non-zero angle of attack. FIG. 12 is a view of the system in the plane, perpendicular to the direction of motion of wing 1101. Adjacent sections of cable-wing 1104 alternate angles of attack as follows: positive-neutral-negative-neutral-positive and so on. As result, sections of cable-wing 1104 move in opposite directions, as shown by arrows.

The system's cycle consists of two phases: a working phase and a returning phase. In the working phase sections of cable-wing 1104 move away from ideal central line and pull belt 1105. Unwinding off drum 804, belt 1105 rotates pulley 803, which rotates the rotor of generator 802. Aerodynamic lift of wing 1101 pulls cable 1102, preventing its movement toward cable-wing 1104. Control system 805 continuously changes the angle of attack of wing 1101 to make its lift force equal to the pull on cable 1102. When cable-wing 1104 achieves a pre-defined amplitude, the returning phase starts. Local angles of attack of its airfoil profile are reversed, and sections of cable-wing 1104 start moving in the opposite direction. Pulling force from belt 1105 and cable 1102 is removed, and a small electric motor, attached to drum 804, wraps belt 1105 back on drum 804 with a small expenditure of the energy. Pulley 803 is disengaged from the rotor of generator 802 in that time. Angle of attack of wing 1101 is changed to decrease lift and drag in the same time. When cable-wing 1104 arrives into a neutral position (nearly straight at its central line), shown in FIG. 12 by the dashed line, large part of belt 1105 is wrapped around drum 804. At this time, the returning phase ends and the working phase begins again.

Figure 13:
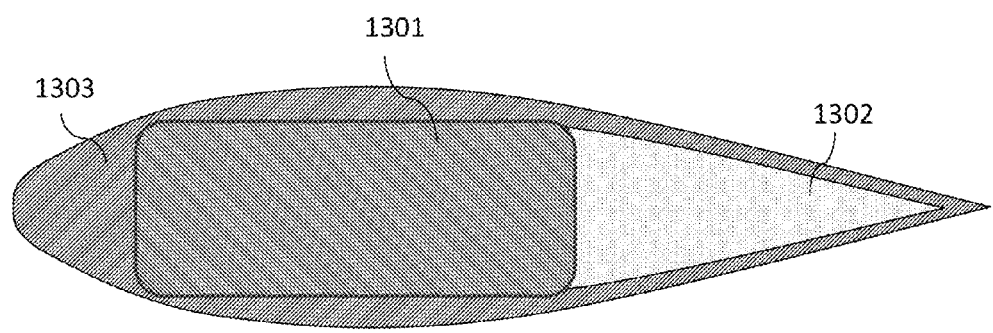
FIG. 13 shows a sectional view of a possible cable-wing.
Figure 14:
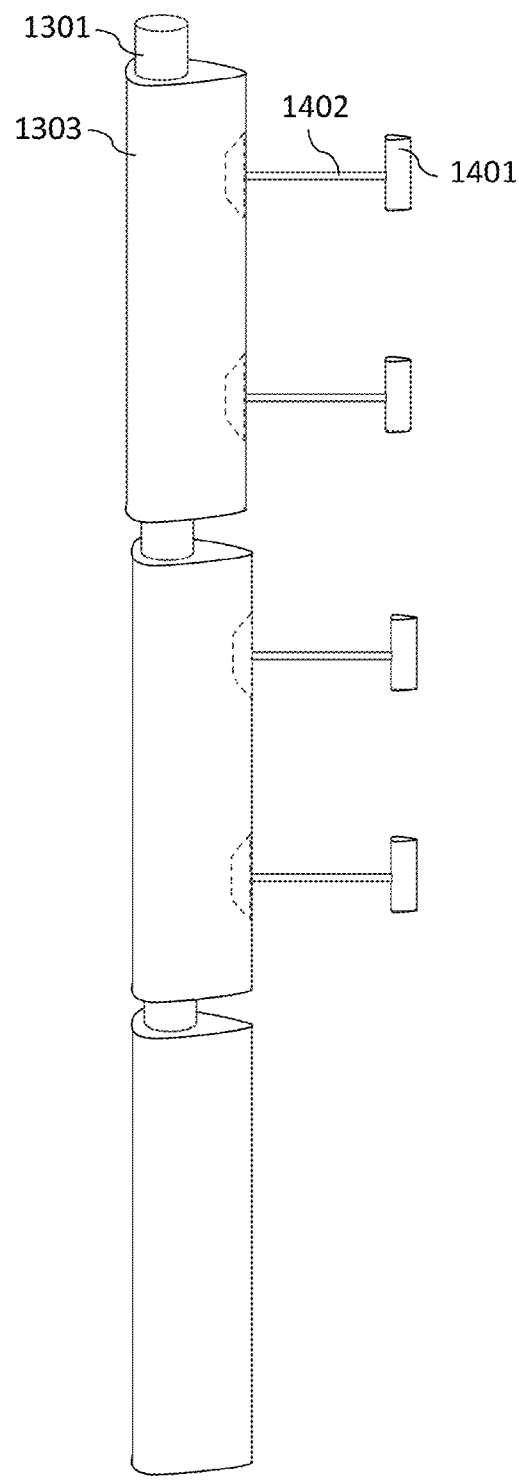
FIG. 14 shows an external view of a fragment of another possible cable-wing.

FIG. 13 shows the cross section of cable-wing 1104. It comprises a load bearing core 1301, made of para-aramid, ultra high molecular weight polyethylene or another light and strong fiber. Core 1301 is covered with a jacket 1303, made of nylon or another material with good fatigue and UV resistance characteristics. The empty space in the back is filled with foam 1302. An electric and/or optical cable can pass inside of cable-wing 1104 alongside core 1301 to transfer data and/or small electric current. More details and variations can be derived from PCT/US12/67143 by the inventor. FIG. 14 is an external view of a fragment of cable-wing 1104. It shows, that jacket 1303 is cut into subsections at equal distances, exposing core 1301, for better flexibility. Micro-wings 1401 are attached to each subsection of cable-wing 1104 on rigid booms 1402. Micro-wings 1401 serve for stabilization of cable-wing 1104 and to change its angle of attack. Some subsections may not have micro-wings, because they do not have to develop lift and are stabilized by the adjacent subsections. The energy, harvested by this system, comes from cable-wing 1104, while wing 1101 serves only to stretch cable-wing 1104 and provide it with velocity at angle to the wind.

Sample System Parameters:
Length of cable-wing 1104: 2,000 meters
Thickness of cable-wing 1104: 3 cm
Chord of cable-wing 1104: 30 cm
Length of line 1102: 200 meters
Length of belt 1105 in the air: variable, 500-1,000 meters
Number of half-waves in cable wing 1104: 10
Length of a half-wave: 200 meters
Peak amplitude of cable-wing 1104: 75 meters
Typical wind speed: 10 m/s
Corresponding speed of wing 1101: 60 m/s
Maximum local transversal speed of cable-wing 1104: 200 m/s Among advantages of this embodiment over existing wind turbines and airborne wind energy conversion systems (AWECS) is its low cost. This embodiment converts what used to be a liability (the drag of the tether) into an asset—cable-wing 1101 both harvests energy and transfers it to the ground generator. This embodiment allows achieving high speed of belt 1105, thus increasing effective RPM of pulley 803 and decreasing forces, acting on the elements of the construction.

Anti-twist device 1103 has a top part and a bottom part, capable of rotating one relative to another on ball bearings. Belt 1105 can be similar to belt 105. Cable 1102 can have a streamlined cross-section. Cable 1102 can be attached to wing 1101 by a plurality of suspension cables, distributing load equally over the surface of the wing, the suspension cables can have streamlined cross-section too. Length of cable 1102 should be sufficient to minimize aerodynamic interference between cable-wing 1104 and wing 1101.

Wing 1101 can be any of the following: a rigid airfoil; a flexible airfoil; a soft airfoil; an inflatable airfoil; an inflatable airfoil, inflated by the ram air, entering it through holes; an inflatable airfoil, inflated with lighter than air gas; an airplane airfoil; a kite; a parafoil; an airfoil, using soft materials, spread over a rigid frame or cables; an airfoil made of elastic fabric, receiving airfoil form from relative air flow; a mixed airfoil, using different construction techniques in its different parts; other types of airfoil. Wing 1101 can be made of various materials, including carbon fiber, fiberglass, aluminum, aramids, para-aramids, polyester, high or ultra-high molecular weight polyethylene and other.

In additional embodiments, wing 1101 moves not in a vertical arc, but at some angle to the horizon. In additional embodiments, it can move in circles or "figures eight". In other embodiments, some of energy is generated from of cable-wing 1104, and some from wing 1101.

Figure 15:
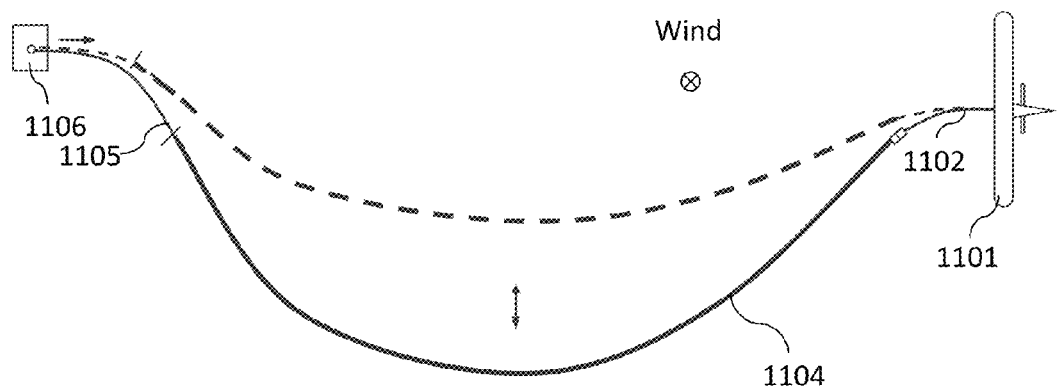
FIG. 15 shows a view of another embodiment in the plane, perpendicular to the wing motion.

In other embodiments, cable-wing 1104 can have varying thickness and/or chord along its length. In additional embodiments, micro-wings 1401 are used not only to change angle of attack, but also to change (locally) the aerodynamic profile of cable-wing 1104, for example, giving it a camber in the desired direction. In other embodiments, the number of half waves in the form of cable-wing 1104 is small (possibly even only one), and cable wing 1104 does not arrive into the central position at the beginning of each working cycle, but each section of it merely moves on one side of the central line, closer and further from it. In other words, the distance of the wave's tops to the central position changes, the smallest distance is at the beginning of the working phase, the largest distance is at the end of the working phase. One such embodiment is shown in FIG. 15, where the position at the beginning of the working phase is shown in the dashed lines, and in the end of the working phase is shown in the solid lines.

One embodiment in this group is a device for converting wind energy into electrical energy, comprising: an airborne assembly, comprising a first sail, moving cross wind, and at least one second sail, attached to the first sail at an angle, and developing lift force in the relative air flow, created by the motion of the first sail; a ground platform with an electric generator, comprising a rotor and a stator; a cable or a belt, attached to the airborne assembly and to means for converting linear motion of the cable or belt into rotational motion of the rotor of the generator; where useful motion of the cable or belt is induced by the aerodynamic force, developed by the second sail; an electronic control system.

The following descriptive elements can be optionally added: the first sail may have an airfoil profile; length of the first airfoil may be comparable to the length of the cable or belt; means for converting linear motion may comprise a pulley, a sprocket or a drum; there may be two or more second sails.

Another embodiment in this group is a method for converting wind energy into electrical energy, comprising steps of: providing an airborne assembly comprising a first sail and a second sail; employing the first sail to develop aerodynamic lift and thus create primary motion of the assembly; employing the second sail to exploit relative air flow, created by the primary motion of the assembly to develop secondary motion in another direction; use secondary motion to drive a rotor of an electric generator or perform another useful work.

Another embodiment in this group is a method for converting wind energy into electrical energy, comprising steps of: providing an airborne sail, comprising control surfaces and having an airfoil profile in at least some of its cross sections; employing the sail to move in the air under power of wind, harvesting wind energy, with velocity that can be decomposed into two substantial components: the first velocity component perpendicular to the lateral axis of said sail, the second velocity component parallel to the lateral axis of the sail; employing a cable or a belt to transfer the second velocity component to the rotor of a ground generator.

Figure 16:
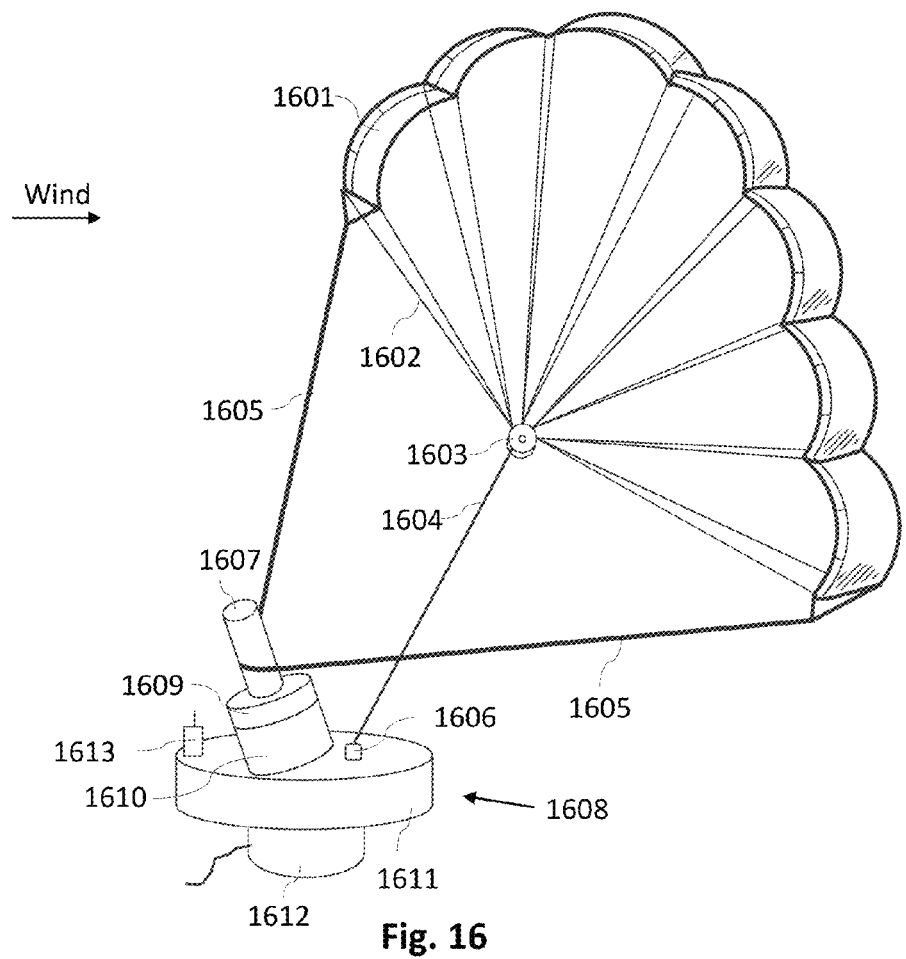
FIG. 16 shows a general view of yet another embodiment of the invention.

FIG. 16 shows an embodiment of the invention. It comprises a large flexible kite wing 1601 with multiple lines 1602, attached at one end to wing 1601 and at another end to a hub 1603. A ground platform 1608 is provided on the ground or water surface. Ground platform 1608 has a rotating plate 1611, installed on top of a fixed base 1612. Hub 1603 is attached to an anchor 1606 on plate 1611 by a tether 1604. A belt 1605 is attached to the ends of wing 1601 and wraps around a pulley 1607, so that linear motion of belt 1605 translates into rotation of pulley 1607. An electric generator 1609 is installed on plate 1611 and rotation of pulley 1607 is transferred to the rotor of generator 1610 via transmission 1609. A control system 1613 is provided to control all aspects of behavior of the system. Plate 1611 can rotate 360 degrees in horizontal plane, accommodating changes in the direction of the wind. Example of the parameters for this embodiment:

Length of tether 1604—2,000 meters
Length of line 1602—1,000 meters
Length of wing 1601—4,000 meters
Length of belt 1605—1,700 meters
Wing altitudes—500 to 2,500 meters
Typical wind speed—10 m/s
Average speed of wing's primary motion (for the typical wind speed)—40 m/s
Speed of belt 1605 (equals to speed of secondary motion)—15 m/s
Exploitable Wind Power—800 MW Wing 1601 consists of cells, and FIG. 17A shows a vertical cross section of a cell of wing 1601. The cell is open from both ends, with a leading edge opening 1703 wider than a trailing edge opening 1704. The cell has a back wall 1701 and a front wall 1702. Walls 1701 and 1702 are made of strong but light fabric, such as rip-stop nylon. In the incoming air flow, the cell obtains an airfoil form, as it is typical in foil kites. Set at angle of attack below critical angle, the wing accelerates and moves up under influence of the wind. The wing is reversible, meaning that the leading edge can turn into the trailing edge. Cords 1705 are used to reverse the wing form, as will be shown below. An arrow with letters pm (primary motion) shows motion of wing 1601 under influence of wind in the plane of its cross section. An arrow with letters AW shows direction of relative air flow (the apparent wind).

FIG. 17B shows a cross section of the multiple cells in the plane of the wing's chord, perpendicular to the cross section in FIG. 17A. The solid lines are internal cell walls 1706 of the wing, made of the same material as outer walls 1701 and 1702. They are inclined at angle 30 degrees to the wing's chord. Internal walls 1706 serve as secondary sails. Under influence of the apparent wind they are pushing the wing in the direction, shown by the arrow with letters sm (secondary motion). FIG. 17B also shows that cord 1705 near leading edge 1703 is relaxed, while cord 1705 near trailing edge 1704 is tensioned. It should be appreciated that the apparent wind has much higher speed value, than the real wind, because of the wing's motion. The cells are roughly rectangular in the cross section, perpendicular to the two cross sections in FIG. 17A and FIG. 17B.

FIG. 17C shows how cords 1705 at the leading and trailing edges of wing 1601 are used to change the wing's profile. Each cord is attached to a device 1707 that can pull in or release cord 1705, when commanded by control system 1613. In the left part of the figure, cord 1705 is fully released and the cells are open to the full height. This is a position for the leading edge. In the right part of the figure, cord 1705 is fully pulled in, the internal walls are folded and the cells are open only to a fraction of its height. This is the position for the trailing edge.

FIG. 18 shows how the system changes angle of attack of wing 1601. Hub 1603 is equipped with a device that pulls and releases lines 1602 on command from control system 1613. When the top line 1602 is slightly shortened and the corresponding bottom line 1602 is slightly extended, the angle of attack of the near sections of the wing changes, as shown in the dashed lines in the figure. It is important that angle of attack of different sections of the wing can be changed independently, thus varying lift and drag in different parts of the wing. This operation is well known in the kite sports. Hub 1603 comprises also a subsystem of control system 1613, including communication means and a CPU or a microprocessor.

Figure 19:
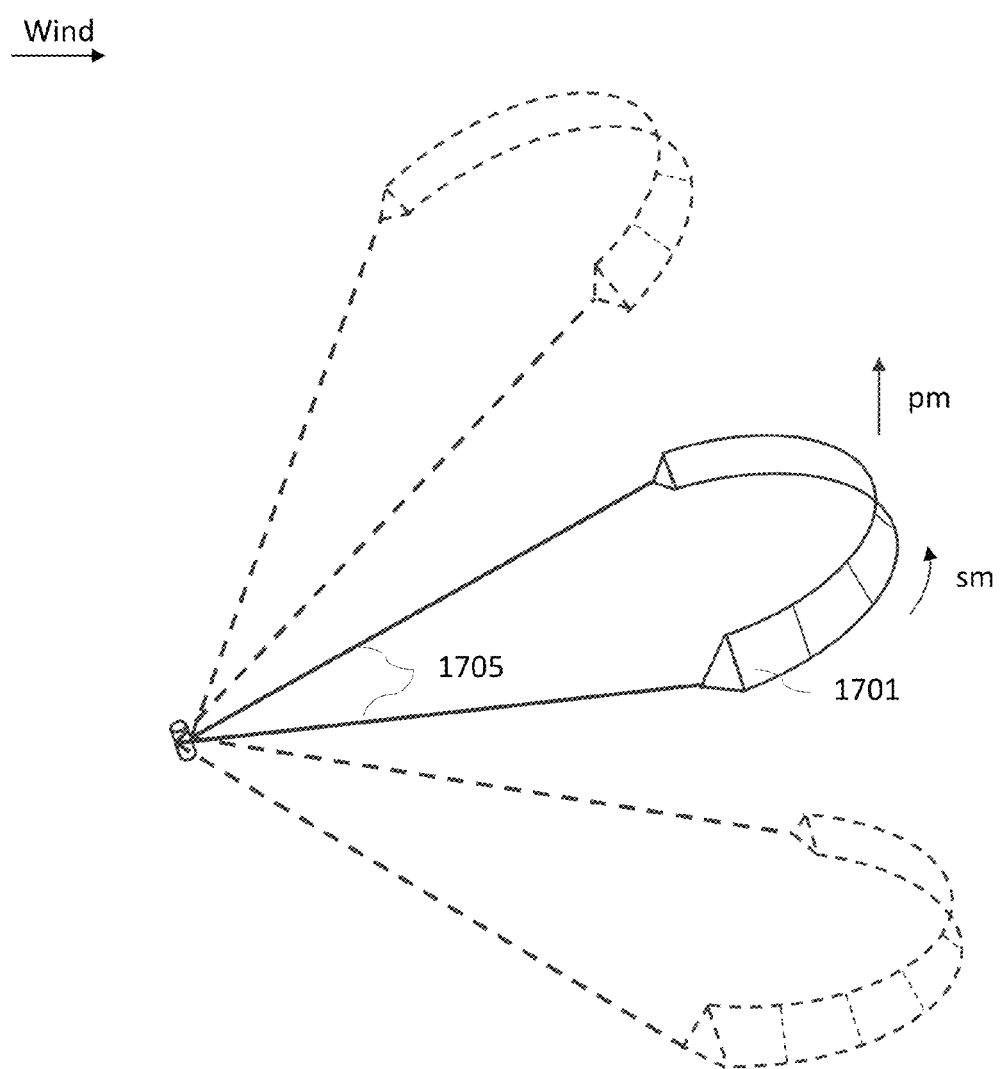
FIG. 19 shows a side view of the motion in this embodiment.

This embodiment operates cyclically, with each cycle consisting of two phases. In the first phase, wing 1601 moves up and counter clockwise (when looking from the top). In the second phase, wing 1601 moves down and clockwise. The middle position of the first phase is shown in FIG. 19 in solid lines, while extreme top and bottom positions are shown in the dashed lines. The vertical motion the primary one, because it is induced by direct wind, and the horizontal motion is the secondary one, because it is induced by the interaction of the airflow with the diagonal cell walls 1706 inside wing 1601. In the extreme positions leading and trailing edges of wing 1601 reverse. For example, when wing 1601 arrives to the top, top lines 1602 are slightly extended, and bottom lines 1602 are pulled in. Aerodynamic forces slow the wing down and then start pushing it down. Simultaneously, lower openings of the cells are opened wider and upper openings of the cells are made narrower. Thus, wing 1601 completely reverses its form and direction.

Figure 20:
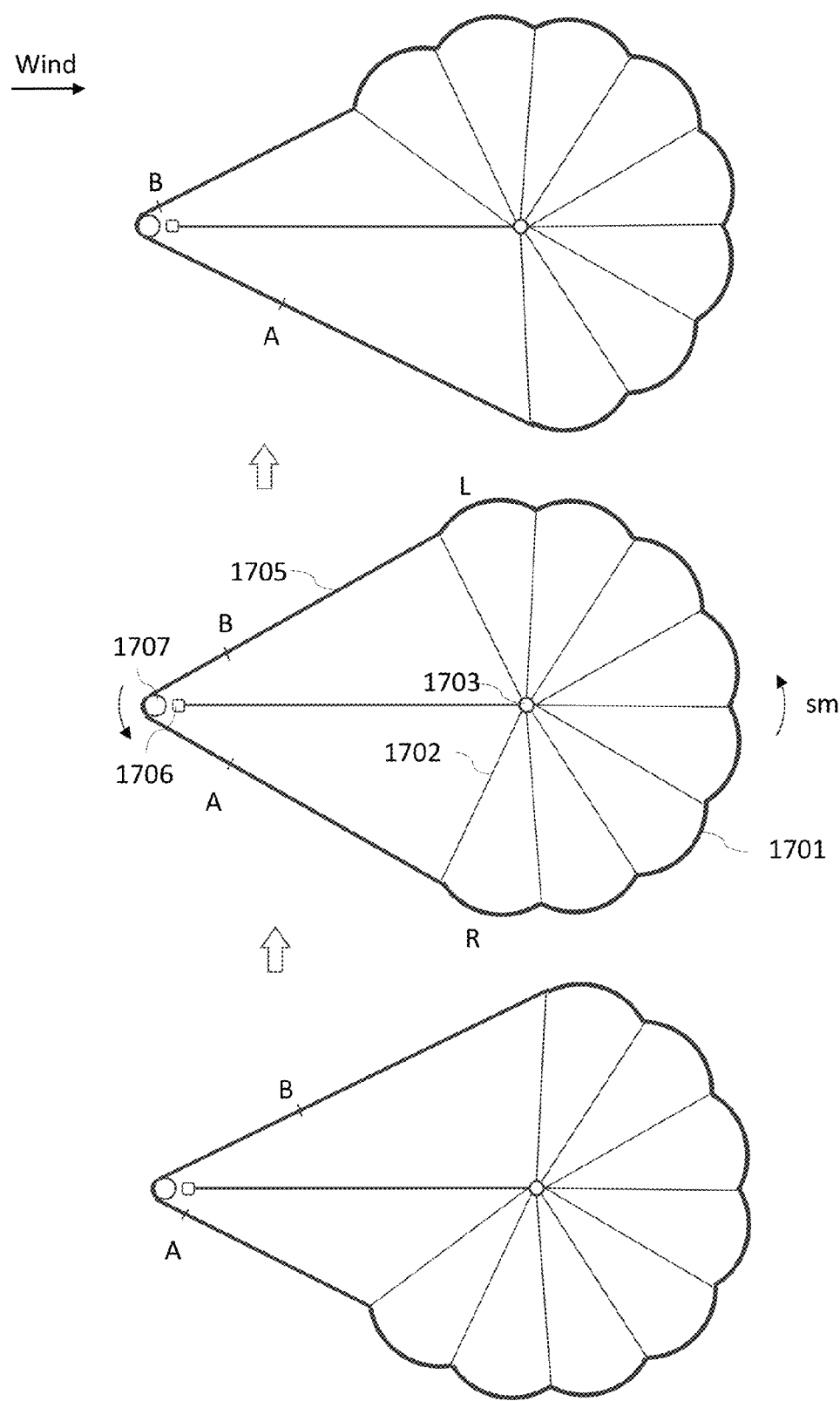
FIG. 20 shows a top view of the motion in this embodiment.

FIG. 20 shows motion of wing 1601 in the plane, created by its lateral axis and the center of ground platform 1608, viewed from the top. This figure consists of three parts. The most bottom part is the beginning of motion the first phase. The top one is the end of motion in the first phase. Wing 1601 has secondary motion counter clockwise, and its ends pull cable 1605, which rotates pulley 1607. Points A and B on belt 1605 are shown in all parts of the figure in order to show better the motion of belt 1605. Thus, wing 1601 can be viewed as rotating around hub 1603. In order to facilitate such rotation, rather than linear motion to one side (i.e. from right to left, if viewed from ground platform 1608 in the first phase), it is necessary to create force in the opposite direction. For example, in the first phase it is achieved by giving higher angle of attack to wing sections on the right side than on the left, when wing 1601 is in the central position. This difference in angles of attack is increased as wing approaches the end of the first phase and more of it moves to the left.

When wing 1601 reverses direction of its motion, so does belt 1605. In the same time, mechanical transmission 1609 disengages and then engages in the reverse direction, so that the rotor of generator 1610 continues its rotation in the same direction.

Among advantages of this embodiment over existing wind turbines and airborne wind energy conversion systems is its low cost. Wing 1601 can be made of a number of identical section, each section containing identical cells made of inexpensive fabric. In this embodiment, majority of expensive components of a wind turbine are replaced by nylon fabric, one square meter of the nylon generating around 10-30 kW.

Control system 1613 comprises a ground based subsystem and an airborne subsystem. The ground based subsystem comprises one or more central processors or microcontrollers, optional sensors and communication means for communication with the airborne control subsystem, carried by hub 1603. Preferable communication means is a wireless network, although optical or copper wires, going through the cable 1604, can be used too. The ground sensors may include anemometer, barometer, radar, hygrometer, thermometer, GPS, cable tension meter, RPM meter, cameras for observing the wings and other. One control system 1613 can serve multiple ground platforms. Control system 1613 can be connected to the Internet to receive general weather information, especially warnings of extreme weather events. Control system 1613 also comprises actuators on ground platform 1608 and hub 1603. Belt 1605 may be similar to belt 105.

Figure 21A:
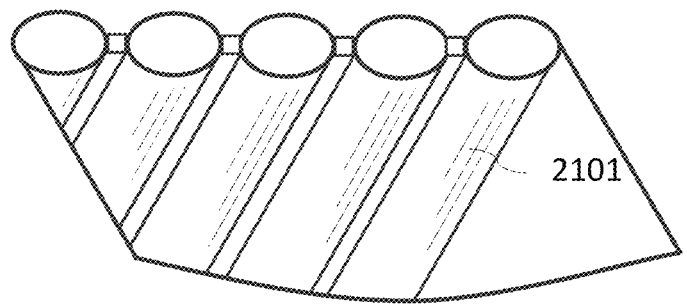
FIG. 21A shows a view of multiple wing cells in another embodiment.
Figure 21B:
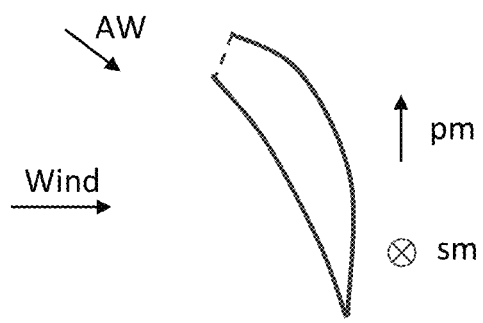
FIG. 21B shows a vertical cross-sectional view of a wing cell in that embodiment.

In related embodiments, the lateral axis of wing 1601 is not horizontal, but vertical or inclined at another angle to the horizon. In more embodiments, other forms of wing and other arrangements of surfaces for creating secondary motion can be used. FIG. 21A shows a fragment of wing 1601 in one such embodiment. A cell 2101 has a round opening on the leading edge and is closed on the trailing edge. Cells 2101 are positioned diagonally next to each other. External surfaces of cells 2101 serve as sails and create secondary motion, as shown in FIG. 21B (a cell cross section in side view, the secondary motion is directed away from the viewer). In yet more embodiments, wing 1601 is replaced by a plurality of airfoils, attached to belt 1605 or a cable permanently or temporary, with their lateral axis at an angle of 15-30 degrees to the direction of belt 1605 at the point of attachment.

Figure 23:
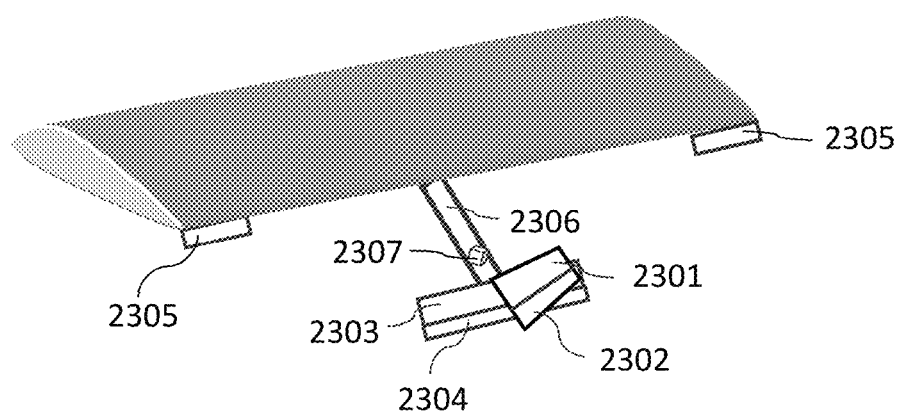
FIG. 23 shows a schematic view of a rigid conventional wing, which may be used in some embodiments of the invention.

FIG. 23 shows the control surfaces of the wing 1101. The control surfaces comprise a vertical stabilizer 2301, a rudder 2302, a horizontal stabilizer 2303, an elevator 2304, and ailerons 2305. The control surfaces 2301-2304 are installed on the end of the boom 2306 and can be combined between them in various combination (like in stabilators, V-tails etc.). An airborne subsystem 2307 of the control system is shown as well.

Figure 24:
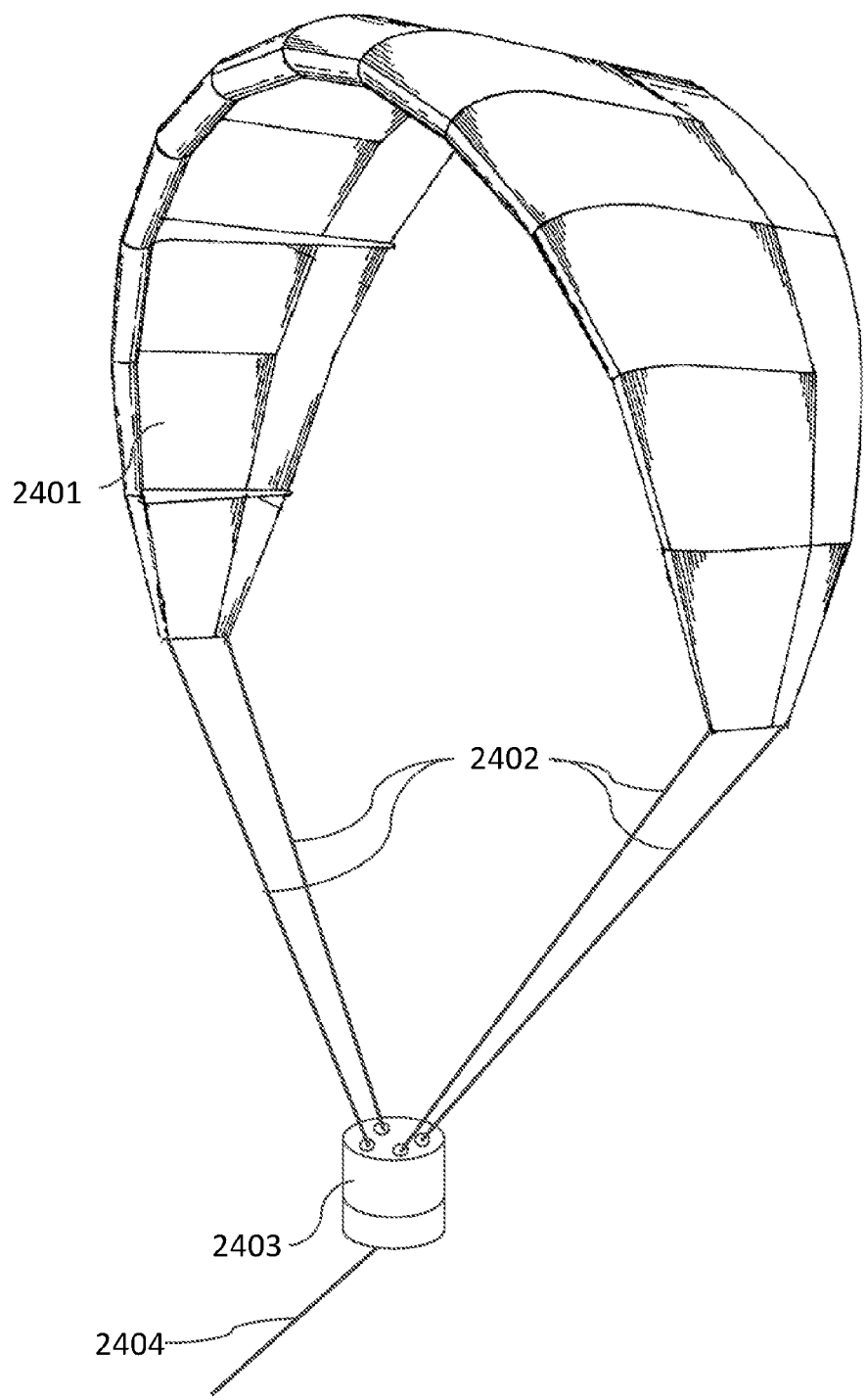
FIG. 24 shows a schematic view of a flexible conventional wing, which may be used in some embodiments of the invention.

FIG. 24 shows another form, suitable for wing 1101. It comprises a flexible canopy 2401, at least 4 combined control and suspension lines 2402 and an underwing pod with a control device 2403. Control device 2403 changes the form and/or angle of attack of the wing by letting out or pulling in lines 2402. In this form, position of the wing relative to the wind and to the horizon is controlled by dynamically changing the lengths of cables 2402. Control device 2403 can be used alone or combined with some control surfaces, used by rigid wings.

The embodiments, described above, can be practiced in offshore location, as well as on the land. In an offshore location, the ground station or the ground platform can be installed on a buoy anchored to the bottom. Thus, the term 'ground' includes surface of a water body, such as an ocean, a sea or a lake.

Features from different embodiments or groups of embodiments can be combined in various ways, obvious to a person skilled in the art, to obtain more useful embodiments.

Thus, an airborne wind energy conversion system with a ground generator and unorthodox power capture or transfer is described in conjunction with multiple specific embodiments. While above description contains many specificities, these should not be construed as limitations on the scope, but rather as exemplification of several embodiments thereof. Many other variations and modifications are possible and contemplated.

What is claimed is:

1. A device for converting wind energy into electrical energy, comprising:
    a ground platform;
    a rotational member on the ground platform;
    an airborne very long flexible wing, coupled to the rotational member;
    wherein flexing of the wing causes significant change in the distance between at least one end of the very long airborne flexible wing and the center of the very long airborne flexible wing; and
    an electric generator on the ground platform, the electric generator being rotationally coupled to the rotational member.

2. The device of claim 1, wherein the very long flexible wing is adapted to harvest wind energy.

3. The device of claim 2, wherein the significant change in the distance is 10% or more.

4. The device of claim 2, wherein the very long flexible wing has a non-cambered profile along most of its length.

5. The device of claim 2, wherein the very long flexible wing has a cambered profile along most of its length.

6. The device of claim 2, wherein wing sections with a camber in one direction alternate with wing sections with a camber in the opposite direction.

7. The device of claim 2, wherein the very long flexible wing is adapted to move crosswind.

8. The device of claim 2, further comprising a belt, coupled to the very long flexible wing; and wherein the rotational member comprises a pulley or a sheave or a sprocket; and wherein the belt is adapted to transfer motion of the very long airborne flexible wing to the rotational member.

9. The device of claim 8, wherein the belt is coupled to one end of the very long airborne flexible wing.

10. The device of claim 8, wherein the belt is coupled to the both ends of the very long airborne flexible wing.

11. The device of claim 2, wherein both end sections of the very long airborne flexible wing have an angle of at least 45 degrees to its central section when airborne.

12. The device of claim 2, wherein the very long airborne flexible wing has at least five control empennages at different distances from the first end of the very long flexible wing.

13. A device for converting wind energy into electrical energy, comprising:
    a ground platform;
    a rotational member on the ground platform;
    an airborne very long flexible wing, coupled to the rotational member;
    a belt, engaging the rotational member and attached to the first end of the very long flexible wing;
    a conventional wing, controlled and stabilized and airborne in the wind, attached to the second end of the very long flexible wing;
    an electric generator on the ground platform, the electric generator being rotationally coupled to the rotational member.

14. The device of claim 13, wherein the very long flexible wing is adapted to harvest wind energy.

15. The device of claim 13, wherein the very long flexible wing is adapted to transfer mechanical power to the electrical generator.

16. The device of claim 15, wherein the mechanical power is transferred through mechanical waves in the very long flexible wing.

17. A method of converting wind power into electrical power, comprising steps of:
    providing an airborne very long flexible wing, coupled to a rotational member on the ground;
    providing an electric generator on the ground, the electric generator being rotationally coupled to the rotational member;
    using the very long flexible wing to harvest the wind power and to transfer it to the electric generator.

18. The method of claim 17, wherein the different parts of the very long flexible wing move in different directions.

19. The method of claim 17, wherein the motion of different parts of the very long flexible wing is controlled separately by an electronic control system.

* * * * *